March 15, 1966 W. THOMA ETAL 3,240,796
PROCESS FOR THE PRODUCTION OF PYROCARBONIC ACID ESTERS
Filed March 27, 1962
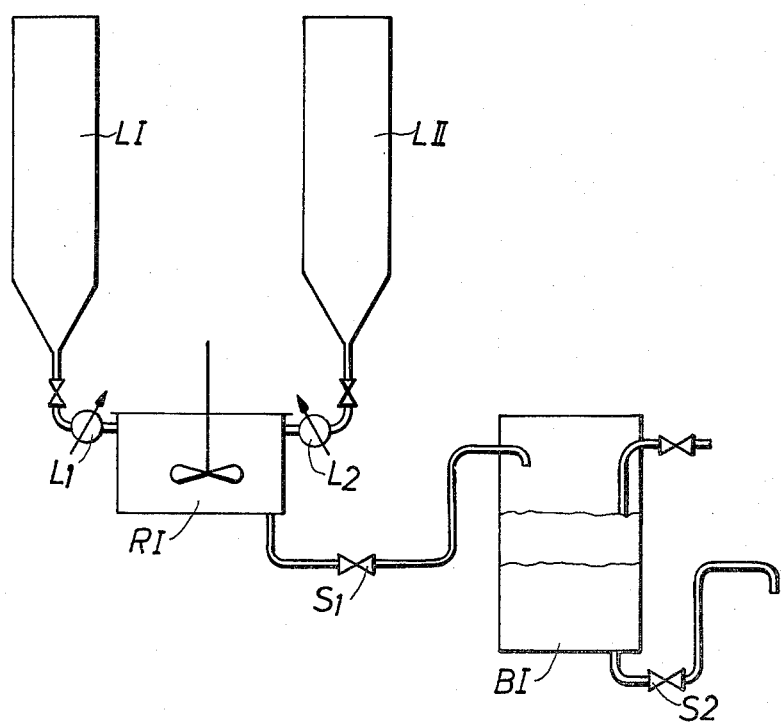
INVENTORS:
WILHELM THOMA, HEINRICH RINKE, HERBERT SCHWARZ.
BY
ATTORNEYS

United States Patent Office 3,240,796
Patented Mar. 15, 1966

3,240,796
PROCESS FOR THE PRODUCTION OF PYRO-
CARBONIC ACID ESTERS
Wilhelm Thoma, Cologne-Flittard, Heinrich Rinke, Leverkusen, and Herbert Schwarz, Opladen, Germany, assignors to Farbenfabriken Bayer Aktiengesellschaft, Leverkusen, Germany, a corporation of Germany
Filed Mar. 27, 1962, Ser. No. 182,789
Claims priority, application Germany, Apr. 13, 1961,
F 33,657
8 Claims. (Cl. 260—453)

The present invention relates to and has as its principal object to provide a new and useful process for the production of pyrocarbonic acid esters by use of tertiary amines as catalysts in the known condensation of esters of chloroformic acid, which is also known as chlorocarbonic acid.

It is already known to produce pyrocarbonic acid esters having the formula hereinafter by reaction of alkylcarbonic acid salts with chlorocarbonic acid esters (see, e.g., V. I. Kovalenko, Zuhr. Obschei Khim. (J. Gen. Chem. U.S.S.R.), vol. 22, pages 1546–1550 (1952), abstract of which appears in Chemical Abstracts, vol. 47, column 8019). By varying the ester radicals, unsymmetrical pyrocarbonic acid esters can also be obtained by this reaction (see, e.g., W. Thoma and H. Rinke, Ann. Chem., vol. 624, pages 30–36 (1959), abstract of which appears at Chemical Abstracts, vol. 54, columns 243–244).

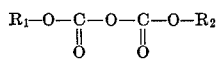

($R_1$ and $R_2$ are organic radicals).

It is further known to obtain pyrocarbonic acid esters with identical ester residues by the action of a dilute solution of potassium hydroxide with a solution of a chlorocarbonic acid ester in chloroform, alkaloid bases in quantities of about 20% by weight calculated on the chlorocarbonic acid ester being added as catalysts. The use of N,N-dimethylaniline has also been described, a yield of about 15% of the theoretical being reported (see T. Boehm, and D. Mehta, Berichte, vol. 71B, pages 1797–1802 (1938)).

In accordance with the present invention it has now been found that pyrocarbonic acid esters can be obtained in a simple manner and in excellent yields, in general between 75 and 85% of the theoretical, by reacting aqueous alkali metal- or alkaline earth metal-hydroxide solutions with solutions of chlorocarbonic acid esters dissolved in solvents that are immiscible with water, with the addition of certain tertiary amines containing one or more nitrogen atoms, all hydrogen atoms of which are substituted by saturated or unsaturated alkyl, cycloalkyl, and/or aralkyl radicals.

For the process of the present invention the following tertiary amines having the formula $NR_3$ are suitable, for example: tri-n-propylamine, tri-isopropylamine, tri-n-butylamine, tri-isobutylamine, N,N-dimethyl-cyclohexylamine, N,N - diethyl - cyclohexylamine, N,N-dimethyl-benzylamine, N,N - diethyl - benzylamine, N,N - di - n-propyl - methylamine, N,N-dimethyl-phenyl-ethylamine, N,N,N',N'-tetramethyl-butylene diamine, phenyl 3-N,N-dimethylaminopropyl ether having the formula $$C_6H_5\text{—}O\text{—}(CH_2)_3\text{—}N(CH_3)_2$$

This list in no way is intended, however, to limit the scope of the present invention.

Mixtures of various amines can be used The quantities to be used lie in general between 0.001 and 1.0 mol, particularly between 0.01 and 0.1 mol, per mol of chlorocarbonic acid ester.

Chlorocarbonic acid esters which can be converted to pyrocarbonic acid esters in accordance with the process of the present invention include alkyl, cycloalkyl, aryl, aralkyl esters of chlorocarbonic acids as well as alkyl esters in which the alkyl group is substituted by a heterocyclic radical. Examples of such esters of chlorocarbonic or chloroformic acid are the methyl, ethyl, n-propyl, isopropyl, cyclohexyl, phenyl, chlorophenyl, cresyl, benzyl, and tetrahydrofurfuryl esters. Bis-chlorocarbonic acid esters, such as, e.g., ethylene or butylene bis-chlorocarbonic acid esters, can also be subjected to the same reaction, in which case a mixture of polymeric pyrocarbonic acid esters is obtained. The foregoing list is likewise not intended to limit the scope of the present invention.

If the reaction is conducted with two different chlorocarbonic acid esters or with a mixture of a monofunctional and a polyfunctional chlorocarbonic acid ester, mixed esters of pyrocarbonic acid as well as mixtures of different symmetrical esters of pyrocarbonic acid are obtained.

Alkalies which may be used in the process of the present invention include, e.g., hydroxides of the alkali metals and alkaline earth metals, especially potassium hydroxide, as a 8–20% solution, or barium hydroxide in solid form. These examples are illustrative only and are not intended to limit the invention.

In the process of the present invention, solvents that are immiscible with water are necessary. Those of higher density are used with advantage, since the separation of phases in a continuous method of operation is then especially good, e.g., with methylene chloride, chloroform, trichlorethylene, 1,2-dichlorethane and tetrachlorethane. Moreover, benzene, toluene, xylene, chlorobenzene, ethyl acetate, di-n-butyl ether and the like can also be used, for example.

The process of the present invention which involves the reaction of the alkali with the solutions of chlorocarbonic acid esters containing one of the specified tertiary amines can preferably be performed at temperatures between —30 and +50° C., especially temperatures between 0 and 10° C.

The process of the present invention may be performed in a batchwise or continuous manner but is advantageously performed in a continuous manner since it permits the rapid withdrawal of the polycarbonic acid esters, which are known to be sensitive to both acid and alkaline reagents, from the reaction zone.

A preferred embodiment of a continuous method for performing the process of the present invention, which is described by reference to the flow sheet that is the subject of the accompanying drawing, is as follows:

In this preferred embodiment, a solution of the ester of chloroformic acid and the tertiary amine as specified herein in an organic solvent having a high specified gravity contained in the tank LI is allowed to flow through flowmeter L1 into a cooled reaction vessel RI while an aqueous solution of an alkali from tank LII is charged through flowmeter L2 into the same cooled reaction vessel RI in which they are thoroughly mixed by stirring. The reaction mixture is then caused to flow through a siphon tube controlled by valve S1 into a settling tank BI in which the organic solvent and aqueous phases separated and each is withdrawn through a corresponding siphon tube. The organic solvent phase containing the ester of pyrocarbonic acid thus formed is then washed and recovered.

In some cases it may be expedient to provide an acid wash before the water washing. For this purpose, dilute mineral acids are used, e.g., hydrochloric or even organic acids, e.g., 3 to 5% acetic acid.

After washing the organic solution containing the resulting pyrocarbonate, it is passed into and through a tower packed with a drying agent, e.g., granular calcium chloride, and the pyrocarbonic acid ester is isolated by distillation in a thin-layer vacuum evaporator (vacuum in general 1 to 2 mm., evaporator temperature about 50 to 60° C.).

Another of a continuous process embodiment consists, e.g., in treating the organic solution containing the unreacted chloroformate in a cascade system of reaction vessels with the aqueous solution of alkali. The reaction can also be carried out in flow tubes.

The advantages of the process according to the invention consist mainly in that with the aid of readily accessible tertiary amines (in contrast to alkaloid bases) high yields of pyrocarbonic acid esters are obtained.

The products of the process are applicable in various technical fields. In particular the pyrocarbonic acid diethyl esters are suitable as stabilizers for beverages. Carboxylic acids can advantageously be converted into carboxylic acid esters by reaction with pyrocarbonic acid esters.

The following examples are given for the purpose of illustrating the invention.

*Example 1*

Discontinuous production of diethyl pyrocarbonate. 108.0 g. of ethyl chloroformate (also known as ethyl chlorocarbonate, having the formula

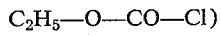

$C_2H_5$—O—CO—Cl)

(95–96%) are dissolved in chloroform. To this solution 5.0 g. of N,N-dimethylbenzylamine (distilled, B.P.: 60.5–61° C./12 mm. Hg) are added. A solution of 58.0 g. of potassium hydroxide in 450 g. of water is added dropwise to the clear solution at a temperature between 0 and 5° C. within 30 minutes, and the mixture is stirred after the addition of the potassium hydroxide is completed for another 30 minutes at 0 to 5° C. After phase separation the chloroform solution is washed twice with 400 to 500 ml. portions of water or once with 2 to 5% hydrochloric acid or 2 to 5% acetic acid and once with water. After drying the chloroform solution over granulated calcium chloride (3 to 4 hours) the chloroform is distilled off in vacuum (water bath about 50° C.). 68 to 72 g. of crude product are obtained which contains 85 to 92% of pyrocarbonic acid diethyl ester, corresponding to a yield of 75 to 85%. After distillation the yield lies between 65 and 70%, boiling point 42° C./0.2 mm. Hg.

*Example 2*

A process for the continuous production of diethylpyrocarbonate is exemplified by reference to the accompanying drawing. Into the storage tank LI is charged 10.85 kg. of diethyl chlorocarbonic acid (95–96%) and 60.0 kg. of chloroform. To this solution 0.5 kg. of distilled N,N-dimethylbenzylamine is added, and another tank LII is charged with 5.80 kg. of a solution of potassium hydroxide in 45 kg. of water.

Through the flowmeters L1 and L2 both reaction solutions from tanks LI and LII flow into the reaction vessel RI. By vigorous stirring, adequate mixing of the two phases can be attained. The reaction temperature is maintained by controlling the rate of addition of the solutions of reactants and by cooling the reaction vessel RI to a temperature between 0 and 5° C. The reaction vessel RI is connected by a siphon S1 with a settling vessel BI. With this the organic phase is conducted through a siphon S2 into a vessel RII similar to the reaction vessel RI, treated with 50 litres of water and turbined for two minutes. Through a siphon S3 the liquid mixture flows into a settling vessel BII, from which the organic phase is drawn off through a siphon S4. For drying the chloroform solution flows through a tower packed with calcium chloride. In a thin layer evaporator the chloroform is separated from the pyrocarbonic acid diethyl ester. Finally the pyrocarbonic acid ester which first runs into the sump is distilled in the thin layer evaporator at 1.0–2.0 mm. Hg and 50–60° C.

We claim:

1. A process for producing pyrocarbonic acid esters comprising reacting an aqueous alkali solution of an alkali selected from the group consisting of alkali metal and alkaline-earth metal hydroxides with a solution of an ester of chloroformic acid selected from the group consisting of methyl, ethyl, N-propyl, isopropyl, cyclohexyl, phenyl, chlorophenyl, cresyl and benzyl esters in a water-immiscible inert organic solvent at a temperature of about —30° C. to +50° C., in the presence of a catalytic amount of a tertiary amine having the formula $NR_3$, in which R is a member selected from the group consisting of alkyl of 1–4 carbon atoms, cyclohexyl and phenoxy propyl.

2. A process as defined in claim 1 in which the tertiary amine is present in an amount between 0.001 and 1.0 mol based on the chloroformic acid ester present.

3. A process as defined in claim 1 in which the tertiary amine is tri-n-butyl amine.

4. A process as defined in claim 1 in which the tertiary amine is N-dimethyl cyclohexylamine.

5. A process as defined in claim 1 in which the tertiary amine is N-dimethyl benzylamine.

6. A process as defined in claim 1 in which the reaction is conducted in a continuous manner.

7. A process for the production of diethyl pyrocarbonate which comprises reacting together with stirring at a temperature between 0 and approximately 5° C. a solution of ethyl chloroformate in chloroform containing a catalytically effective amount of N,N-dimethylbenzylamine with an aqueous solution of potassium hydroxide and subsequently recovering the resulting diethyl pyrocarbonate.

8. A process as defined in claim 1 in which the reaction is conducted at a temperature between 0 and 10° C.

References Cited by the Examiner

FOREIGN PATENTS 808,490   2/1959   Great Britian.

OTHER REFERENCES

Boehm et al., Ber. Deut. Chem., 71B, 1797–1802 (1938).

CHARLES B. PARKER, *Primary Examiner.*